(12) United States Patent
Scofield

(10) Patent No.: US 6,734,801 B2
(45) Date of Patent: May 11, 2004

(54) SWITCH FRAME ELECTRONIC AIR FILTER ALARMING DEVICE

(75) Inventor: William H. Scofield, Batavia, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/180,687

(22) Filed: Jun. 26, 2002

(65) Prior Publication Data

US 2004/0001003 A1 Jan. 1, 2004

(51) Int. Cl.[7] ............................................. G08B 21/00
(52) U.S. Cl. ....................... 340/607; 340/606; 340/608; 96/421; 96/424
(58) Field of Search ................................ 340/607, 610, 340/611, 606, 608, 609; 96/424, 425, 429, 421

(56) References Cited

U.S. PATENT DOCUMENTS

| | | | | |
|---|---|---|---|---|
| 5,057,821 A | * | 10/1991 | Card ........................... | 340/610 |
| 5,205,156 A | * | 4/1993 | Asano et al. .................. | 73/38 |
| 5,232,478 A | * | 8/1993 | Farris .......................... | 55/104 |
| 5,351,035 A | * | 9/1994 | Chrisco ....................... | 340/607 |
| 5,772,732 A | * | 6/1998 | James et al. .................. | 95/25 |
| 6,110,260 A | * | 8/2000 | Kubokawa ..................... | 96/26 |
| 6,320,513 B1 | * | 11/2001 | Timmons, Jr. ............... | 340/607 |
| 6,402,822 B1 | * | 6/2002 | Najm .......................... | 96/429 |

* cited by examiner

Primary Examiner—Toan N Pham

(57) ABSTRACT

An alarming apparatus and methods for use with an air filter are disclosed herein. A filament can be stretched across a portion or section of an air filter frame, wherein the portion or section comprises a first locus and a second locus located diagonally opposite the first locus. The filament can be attached at a first end of the filament to the air filter frame at the first locus. A micro-switch can be attached to a second end of the filament at the second locus. Additionally, an alarm can communicate through a communications device (wired and/or wireless) with the micro-switch, such that when the air filter becomes loaded with debris, the air filter deflects thereby causing a force to be exerted on the filament, which in turn triggers the micro-switch to transmit a signal to the alarm indicating that the air filter requires proper attention thereof. The filament can be stretched facing either an upstream or a downstream side of airflow thereof.

20 Claims, 5 Drawing Sheets

SWITCH FRAME ELECTRONIC AIR FILTER ALARMING DEVICE

TECHNICAL FIELD

The present invention is generally related to air filters and air filter frames. The present invention also relates to air filter media. Additionally, the present invention relates to HVAC systems and air filters thereof. The present invention also relates to filaments and micro-switch components.

BACKGROUND OF THE INVENTION

The problem of purification and filtration of indoor air is an important one and cannot be over-estimated. Tuberculosis, legionella, sinusitis, allergies, bronchitis, asthma, and other health problems can be caused to a large extent by indoor air pollution. Therefore, air filtration systems that can provide adequate and efficient particle removal capabilities are constantly needed for purification of the indoor air.

Air filters such as those used in HVAC systems are fabricated with many different types of filter media. Depending upon the type of substance sought to be filtered or removed from air (e.g. particles, carbon monoxide, smoke, formaldehyde, organics, etc.), or the useful filter life required, different medias are selected. Examples of such medias are wet or dry laid paper, synthetic microfiber media, metal mesh, wet or dry laid fiberglass, activated carbon impregnated media, tack coated polyester and synthetic media impregnated with potassium permanganate.

Air filters, particularly those utilized in association with HVAC systems generally fall into categories. The first category includes disposable type air filters, which are probably the most common types of air filters currently in use. Disposable type air filters have been on the market for many years. Such disposable air filters have been made for both consumer and commercial use in HVAC systems. These inexpensive filters provide protection mainly for the HVAC system itself. These filters are provided so that large objects are captured before they cause damage to the fan motor and other components. In general, these low-efficiency filters were not intended to capture smaller particles of dust, pollen and mold that pass through to the indoor environment.

The second type of air filter falls into the permanent-type category of air filters. A very large number of permanent-type air filters have recently entered the market. These permanent type filters are generally made of a rigid aluminum frame. The filter material is received between two walls of expanded metal material. The filter material is made of a very pliable material having little or no interior strength. The expanded metal material can be used to form a honeycomb shape around the filter material. The expanded metal is used to support the filter material within the frame.

One major problem with air filters is that they have a habit of rapidly becoming loaded with material and debris. Standard air filters require changing at least every month or two, depending upon the type of HVAC system with which they are utilized. Often, however, individuals forget to check on the status of such air filters. Time passes quickly and after several months these air filters can become clogged with debris, which in turn can cause damage to the associated HVAC system. For example, an air filter frame overloaded with debris can result in a lost of cooling, which can lead directly to the overheating and failure of one or more of the components associated with an HVAC system. The failure of these components can, in turn, result in a total system failure. The HVAC system manufacturers typically bear the cost of repairing the failed system. In addition, the manufacturers will typically experience a negative impact on the reputation of their HVAC system products.

Based on the foregoing, the present inventor has thus concluded that a need exists for an air filter alarming apparatus and associated methods, which can signal the need for required attention of the air filter frame of an air filter. The present inventor believes that a combination of modern switching and filament technology offers solutions to this problem, which are described in greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide an improved air filter.

It is another aspect of the present invention to provide an air filter alarming apparatus and associated methods.

It is yet another aspect of the present invention to provide a filament and micro-switch for use in configuring an air filter alarming apparatus and associated methods.

It is still another aspect of the present invention to provide an air filter alarming apparatus and associated methods, which can be utilized in association with HVAC systems.

The above and other aspects of the invention can be achieved as will now be briefly described. An alarm apparatus and methods thereof for an air filter are disclosed herein. A filament can be stretched across a portion or section of an air filter frame, wherein the portion or section comprises a first locus and a second locus located opposite the first locus. The filament can be attached at a first end of the filament to the air filter frame at the first locus. A micro-switch can be attached to a second end of the filament at the second. Additionally, an alarm can communicate with the micro-switch, such that when the air filter becomes loaded with debris, the air filter deflects thereby causing a force to be exerted on the filament, which in turn triggers the micro-switch to transmit a signal to the alarm indicating that the air filter requires proper attention thereof. The filament can be stretched facing either an upstream or a downstream side of airflow thereof.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
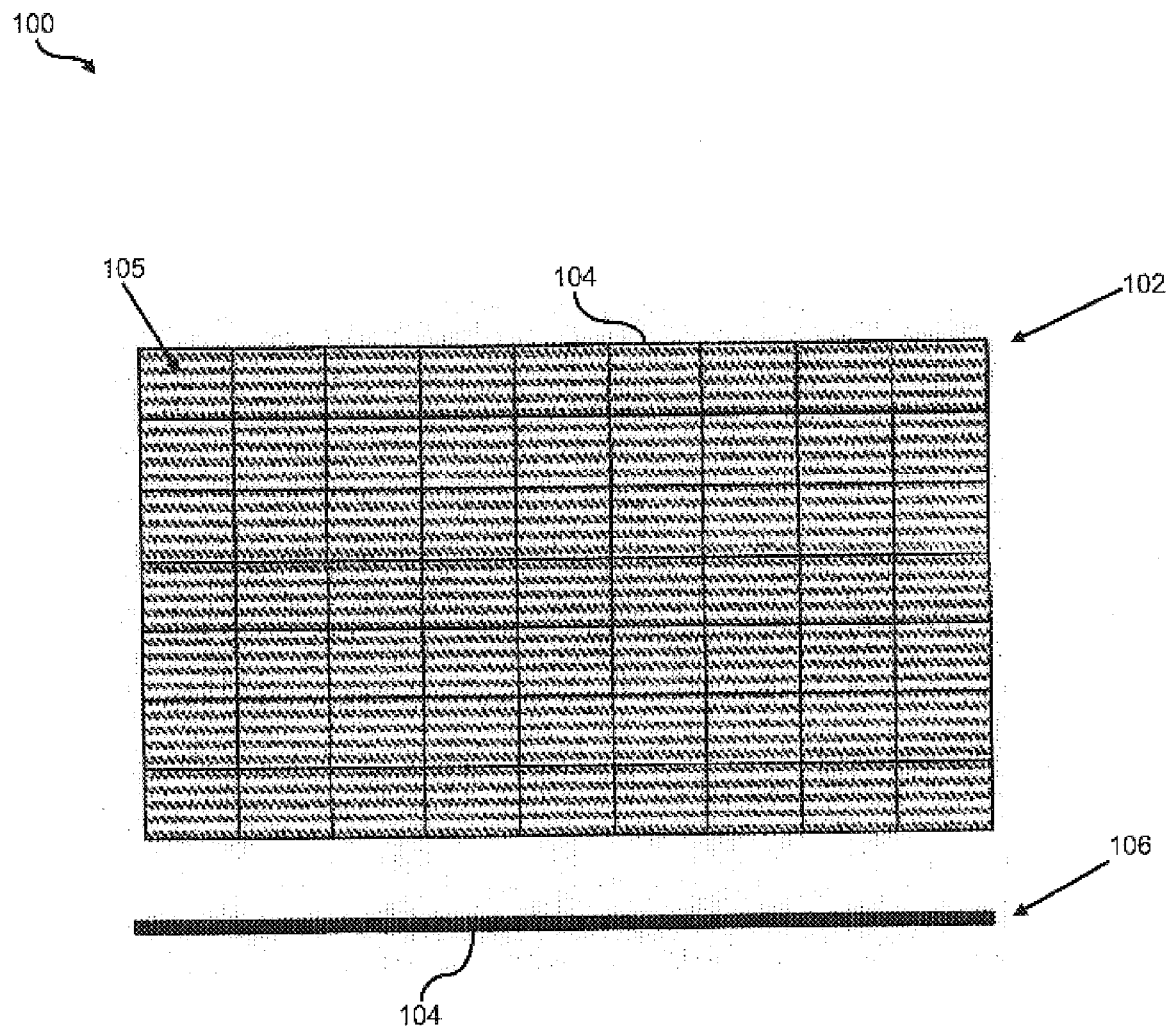
FIG. 1 illustrates a block diagram of an air filter frame, which can be modified in accordance with a preferred embodiment of the present invention.

FIG. 1 illustrates a block diagram 100 of an air filter frame 104, which can be modified in accordance with a preferred embodiment of the present invention. Air filter frame 104 can be configured to include a plurality of sections or portions. An example of an individual portion or section is illustrated via section 105 in FIG. 1. Block diagram 100 illustrates both a front or top view 102 of air filter frame 104 and a side view 106 thereof. Air filter frame 104 can be configured with an air filter frame surrounding replaceable filter media thereof. Air filter frame 104 can be configured as a disposable air filter or a reusable air filter. Filter media contained with the air filter frame can be replaced, if necessary.

One of the problems with utilizing traditional air filter frames and replaceable filter media thereof is that it is often difficult to manually monitor the contents of the air filter. As material and debris accumulates on the air filter frame 104, a threshold is eventually attained at which the air filter can no longer function. When the air filter becomes loaded with such debris, proper airflow can be inhibited, thereby causing thermally related issues. For example, in an HVAC system that relies on such an air filter, an overloaded air filter can actually force air back toward the blower and damage (i.e., burn out) the air conditioner and/or heating units thereof.

Note that as utilized herein the terms "air filter frame" and "air filter" can be utilized interchangeable. It is generally understood, however, that an air filter frame can be configured from an air filter frame and filter media thereof. Also, as utilized herein, the acronym HVAC refers generally to Heating, Ventilation and Air-conditioning. HVAC also encompasses the scope of refrigeration and air conditioning. Many times, HVAC is also referred to as HVAC&R. HVAC deals with the art, science and engineering of the addition or removal of heat from a space to the outside, to maintain a level of comfort in an office, home or for industrial purposes. The rejected heat can be transferred to the atmosphere, and, as in the case of ship air-conditioning, to the seawater. HVAC also deals with the cleanliness of air by the removal of particulate suspended matter in the air, such as cigarette smoke, and aerosols (fine liquids suspended in the air, as from an air-freshener).

Figure 2:
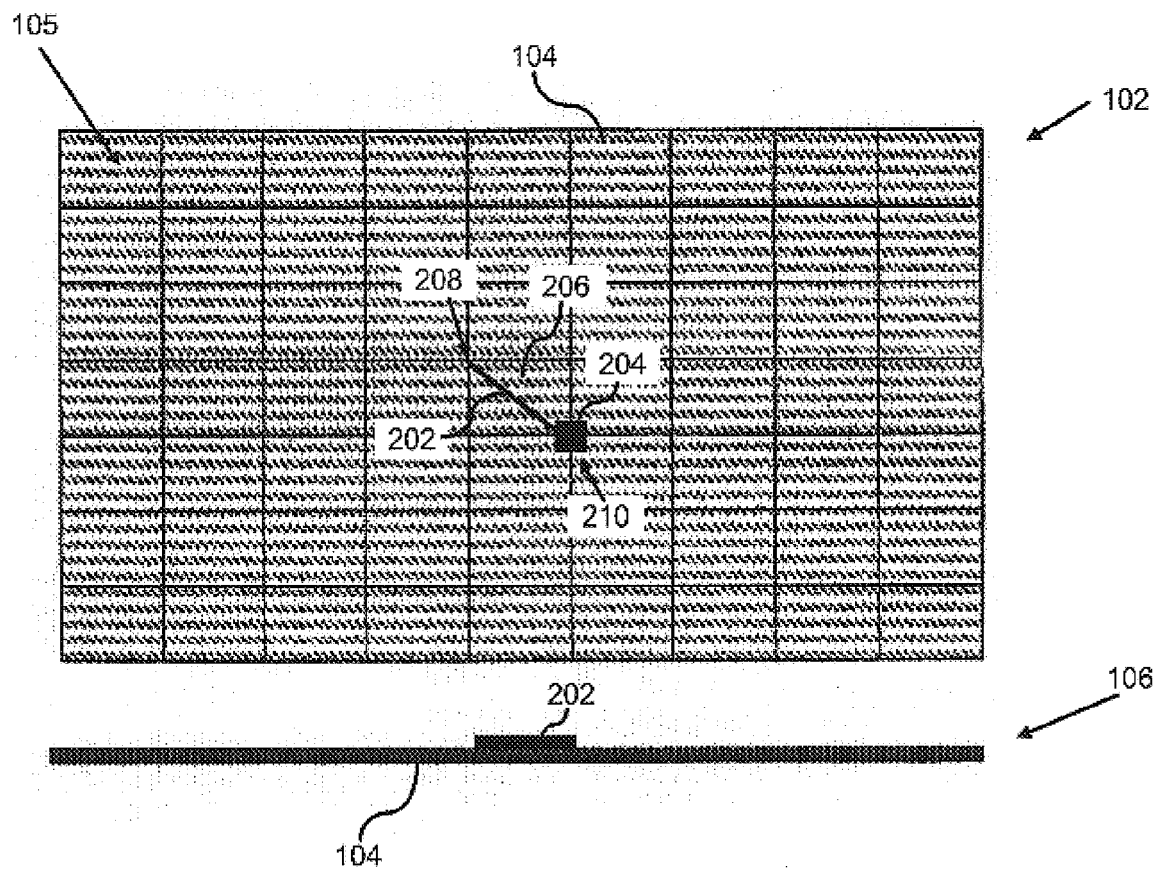
FIG. 2 depicts block diagram of the air filter frame illustrated in FIG. 1, which can be adapted for use in accordance with a preferred embodiment of the present invention.

FIG. 2 depicts block diagram 200 of the air filter frame 104 illustrated in FIG. 1, which can be adapted for use in accordance with a preferred embodiment of the present invention. Note that in both FIGS. 1 and 2, like or analogous parts are indicated by identical reference numerals. Air filter frame 104 depicted in FIG. 2 differs from air filter frame 104 of FIG. 1 in that the air filter 104 can be modified to include a tiny filament 202 stretched across a small section 206 of air filter frame 104 from one locus to another locus thereof on either the upstream or downstream of airflow associated with air filter 104. Filament 202 can be attached to air filter frame 104 at one locus of section 206, such as for example, corner 208 of section 206. At the opposite locus (e.g., the opposite corner) of section 206, filament 202 can be connected to the air filter frame 104 and a small micro-switch 204. When the filter media becomes loaded with debris, it will thus deflect, thereby causing a force to be exerted on filament 202. This force will trigger the micro-switch 210, which in turn can indicate to an associated fan unit alarming system that air-filter 104 requires attention.

Figure 4:
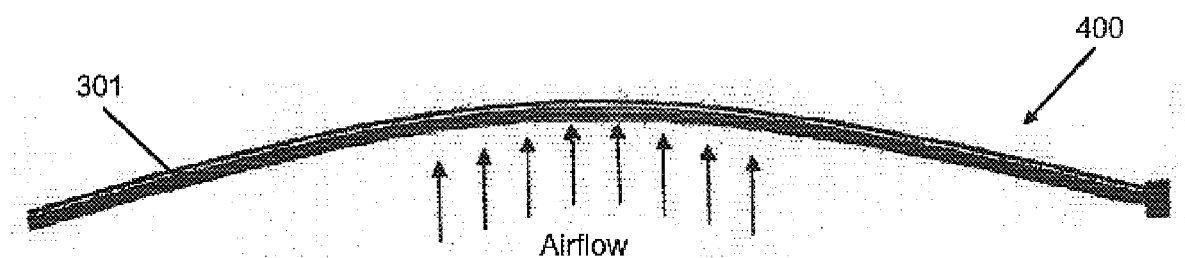
FIG. 4 depicts a side view of the air filter frame illustrated in FIG. 3 in a flexed position, in accordance with a preferred embodiment of the present invention.
Figure 3:
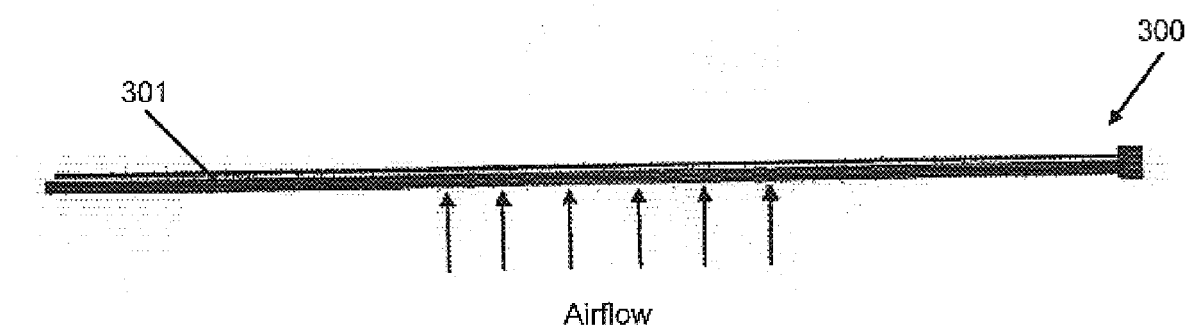
FIG. 3 illustrates a side view of an air filter frame under normal operation, in accordance with a preferred embodiment of the present invention.

FIG. 3 illustrates a side view 300 of an air filter frame 301 under normal operation, in accordance with teachings of a preferred embodiment of the present invention. FIG. 4 depicts a side view 400 of the air filter frame 301 illustrated in FIG. 3 in a flexed position, in accordance with teachings of a preferred embodiment of the present invention. Note that in FIGS. 3 and 4, like or analogous parts are indicated by identical reference numerals. Note that air filter frame 301, which is illustrated in FIGS. 3 and 4, is generally analogous to air filter frame 104 depicted in FIGS. 1 and 2. Under normal operation (i.e., clean filter media), the micro-switch (e.g., micro-switch 204) will not be triggered. When the air filter which comprises air filter frame 301 and filter media thereof becomes loaded with dust and debris, it restricts airflow, causing the filter media to flex, which in turn applies pressure on the micro-switch. Pressure on the micro-switch triggers an associated electrical circuit, which causes an alarm to signal a need for filter attention (e.g., cleaning or replacement of the air filter). View 400 of FIG. 4 indicates that the flexed position triggers the micro-switch and completes an electrical circuit, which in turn sends an alarm to an associated alarm system, which may be integrated with or associated with an HVAC system thereof.

Figure 5:
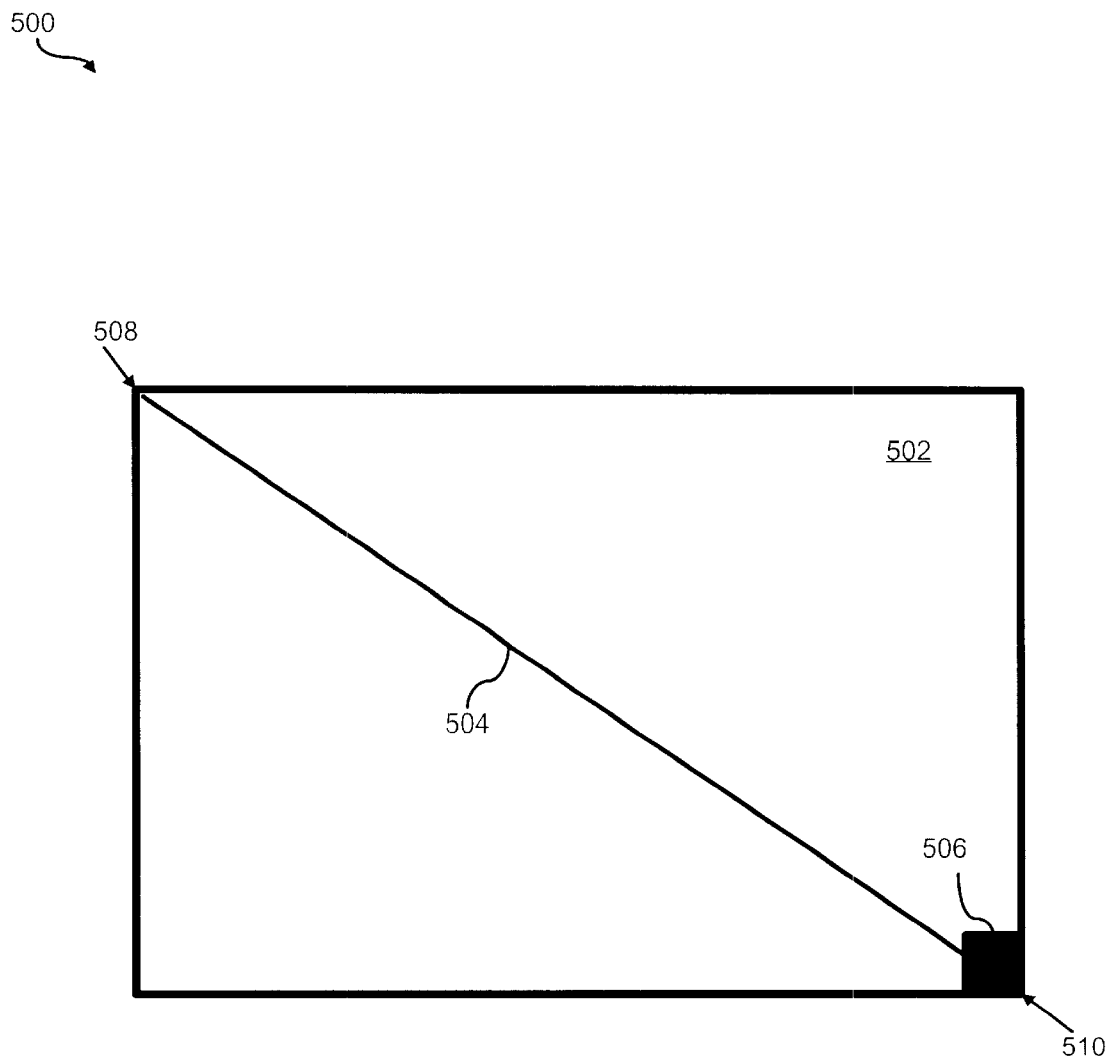
FIG. 5 illustrates a block diagram illustrating a section of an filter frame, in accordance with a preferred embodiment of the present invention.

FIG. 5 illustrates a block diagram 500 illustrating a section 502 of an filter frame, in accordance with a preferred embodiment of the present invention. Section 502 comprises a section of an air filter frame, such as, for example air filter frame 104 of FIGS. 1 and 2 or air filter frame 301 of FIGS. 3 and 4. Section 502 is thus generally analogous to sections of an air filter frame, such as, for example, sections 105 and 206 of FIGS. 1 and 2. As indicated in FIG. 5, section 502 includes a first locus 508 and a second locus 510, which can be located opposite and diagonal first locus 508. Filament 504 can be attached at a first end of filament 504 to section 502 at first locus 508. A micro-switch 506 attaches to filament 504 at a second end of filament 504. The micro-switch 506 is further attached or mounted to the air filter frame at the second locus 510 of section 502. Note that filament 504 of FIG. 5 is generally analogous to filament 202 depicted in FIG. 2. Note that a hole may be formed at the first locus 508 which may be utilized to attach filament 504 to section 502 of the air filter frame. Similarly, one or more holes can be provided at or proximate to second locus 510 to permit micro-switch 506 to be attached or mounted to the air filter frame. Filament 504 is can thus be attached to micro-switch 506 and first locus 508.

Figure 6:
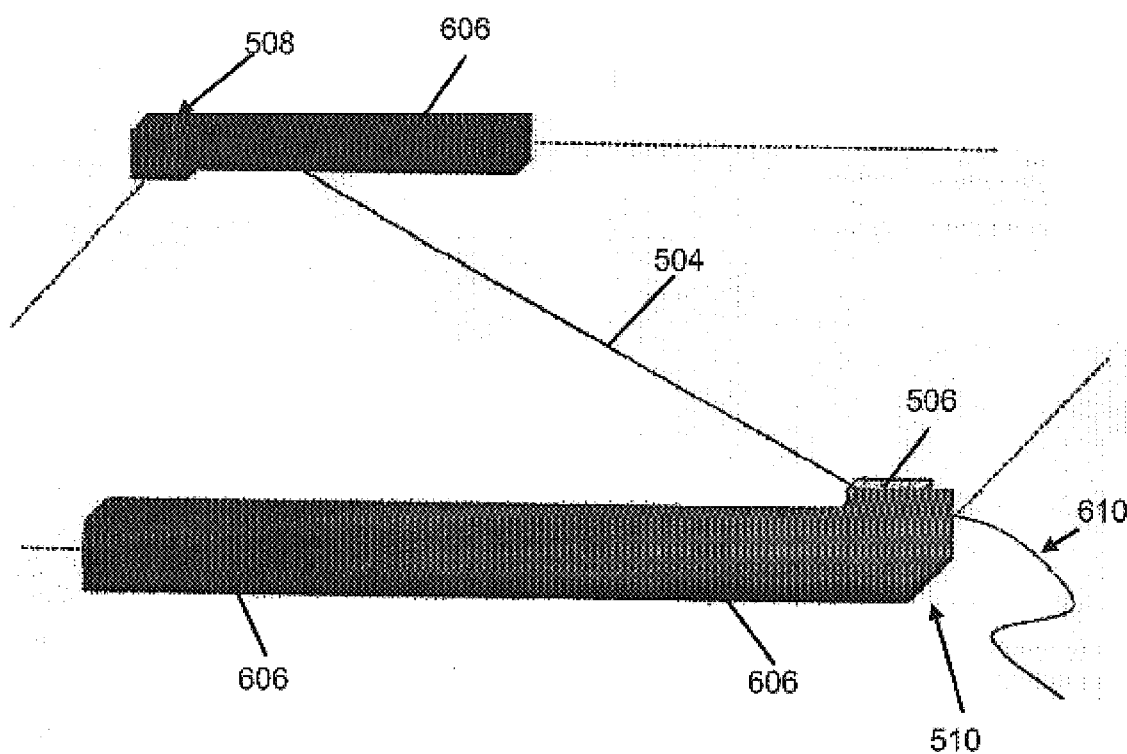
FIG. 6 depicts a perspective view indicating how the filament of FIG. 5 can be bonded to a frame, in accordance with a preferred embodiment of the present invention.

FIG. 6 depicts a perspective view 600 indicating how the filament 504 of FIG. 5 can be bonded to a frame, in accordance with a preferred embodiment of the present invention. Filament 504 is bonded to air filter frame 606, which is analogous to air filter frame 104 of FIGS. 1 and 2 and air filter frame 301 of FIGS. 3 and 4. Only portions of air filter frame 606 are indicated in FIG. 6. Note that in FIGS. 5 and 6, like or analogous parts are indicated by identical reference numerals. An electrical connection 610 can permit micro-switch 506 to communicate with a fan unit alarm card (not illustrated). Note that although only individual sections have been described herein, such as, for example section 502 of FIG. 5, it can be appreciated that a plurality of filaments may be applied to a plurality of such sections in accordance with the apparatus and method of the present invention, if necessary.

Based on the foregoing, it can be appreciated that the present invention disclosed herein is directed toward an alarm apparatus and methods for deploying an air filter. A filament can be stretched across a section of an air filter frame, wherein the section comprises a first locus and second locus located opposite the first locus. The filament is generally attached at a first end of the filament to the air filter frame at the first locus. A micro-switch is attached to a second end of the filament at the second locus. Additionally, an alarm communicates with the micro-switch, such that when the air filter becomes loaded with debris, the air filter deflects thereby causing a force to be exerted on the filament, which in turn triggers the micro-switch to transmit a signal to the alarm indicating that the air filter requires proper attention thereof. The filament can be stretched to face either the upstream or downstream side of airflow thereof.

The air filter alarming apparatus and methods described herein can be utilized in a number of commercial applications. For example, the present invention can be incorporated into any system requiring the removal of debris from an air stream. The present invention can be extremely useful in HVAC systems and in any system requiring the use of air filters. For example, automobiles routinely utilize air filters. The present invention can be implemented in the context of automobile air filters associated with HVAC automobile systems. The need to monitor the status of air filters is important in facilities that manufacture integrated circuits. Integrated circuit fabrication facilities, for example, require extremely clean air conditions. The ability to change the air filter at proper times is thus crucial in such high technology industrial operations.

Additionally, it can be appreciated that a variety of configurations can implemented in accordance with the apparatus and methods described herein. For example, the micro-switch described herein can be configured to communicate wirelessly with the alarm described herein. Thus, the micro-switch can be configured to wirelessly transmit a signal to a fan unit alarming system through a communications device (i.e., a wireless device) when the filter media becomes loaded with debris causing the air filter frame to bend, which in turn causes a force to be exerted on the filament. Wireless transmission of electromagnetic radiation communication signals can be utilized to transmit RF signals from the micro-switch described herein either directly to the HVAC system and alarm unit thereof or through a local area network (LAN), the use of which is well known in the telecommunications arts. Note that such a communications device can be configured solely as a non-wireless device (e.g., a wired device) and/or a wireless communications device, depending upon a desired implementation.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

We claim:

1. An alarm apparatus for use with an air filter, said apparatus comprising:

a filament stretched across at least one portion of an air filter frame of said air filter, wherein said at least one portion comprises a first locus and a second locus located opposite said first locus, such that said filament is attached at a first end of said filament to said air filter frame at said first locus;

a switch attached to a second end of said filament, said switch mounted to said air filter at said second locus of said at least one portion of said air filter frame; and an alarm that communicates with said switch, such that when said air filter becomes loaded with debris, said air filter deflects thereby causing a force to be exerted on said filament, which in turn triggers said switch to transmit a signal to said alarm indicating that said air filter requires proper attention thereof.

2. The apparatus of claim 1 wherein said filament is stretched across said at least one portion of said air filter frame facing an upstream side of airflow thereof.

3. The apparatus of claim 1 wherein said filament is stretched across said at least one portion of said air filter frame facing a downstream side of airflow thereof.

4. The apparatus of claim 1 wherein said switch is attached to said air filter frame by a wire which joins said switch to said second locus of said at least one portion of said air filter frame.

5. The apparatus of claim 1 wherein said alarm communicates with said switch through an electrical circuit thereof.

6. The apparatus of claim 1 further comprising a fan unit alarm card connected to said alarm.

7. The apparatus of claim 6 wherein said fan unit alarm card communicates with a Heating, Ventilating and Air Conditioning (HVAC) system.

8. The apparatus of claim 1 wherein said switch comprises a micro-switch.

9. An alarming apparatus for an air filter, said apparatus comprising:

a filament stretched across at least one section of an air filter frame of said air filter, wherein said at least one section comprises a first corner and a second corner located diagonally opposite said first corner, such that said filament is attached at a first end of said filament to said air filter frame at said first corner;

a micro-switch attached to a second end of said filament and mounted at said second corner of said at least one section of said air filter frame, wherein said micro-switch is electrically connected to a wire which is connected to a communications device; and an alarm that communicates with said communications device, such that when said air filter becomes loaded with debris, said air filter deflects thereby causing a force to be exerted on said filament, which in turn triggers said micro-switch to transmit a signal to said alarm indicating that said air filter requires proper attention thereof.

10. The apparatus of claim 9 further comprising:
a fan unit alarm card connected to said alarm, wherein said alarm communicates with said micro-switch through an electrical circuit thereof; and
wherein said fan unit alarm card communicates with a Heating, Ventilating and Air Conditioning (HVAC) system.

11. An alarm method for providing an alarm associated with an air filter, said method comprising the steps of:
stretching a filament across at least one portion of an air filter frame of said air filter, wherein said at least one portion comprises a first locus and a second locus located opposite said first locus, such that said filament is attached at a first end of said filament to said air filter frame at said first locus;
attaching a switch to a second end of said filament at said second locus of said at least one portion of said air filter frame; and
automatically triggering said switch to transmit a signal to an alarm indicating that said air filter requires proper attention thereof, when said air filter becomes loaded with debris, said air filter deflects thereby causing a force to be exerted on said filament.

12. The method of claim 11 further comprising the step of:
stretching said filament across said at least one portion of said air filter frame facing an upstream side of airflow thereof.

13. The method of claim 11 further comprising the step of:
stretching said filament across said at least one portion of said air filter frame facing a downstream side of airflow thereof.

14. The method of claim 11 further comprising the step of:
attaching said switch to said air filter frame by a wire that joins said switch to said second locus of said at least one portion of said air filter frame.

15. The method of claim 11 further comprising the step of:
permitting said alarm to communicate with said switch through an electrical circuit thereof.

16. The method of claim 11 further comprising the step of:
connecting a fan unit alarm card to said alarm.

17. The method of claim 16 wherein said fan unit alarm card communicates with a Heating, Ventilating and Air Conditioning (HVAC) system.

18. The method of claim 11 further comprising the step of:
configuring said switch to comprise a micro-switch.

19. The method of claim 11 wherein said at least one portion of said air filter frame comprises a section of said air filter frame.

20. The method of claim 19 wherein said first locus comprises a first corner of said section and said second locus comprises a second corner of said section, wherein said first corner is located opposite said second corner.

* * * * *